July 25, 1944.  R. P. McMAHON  2,354,530
FISHING REEL
Filed Jan. 30, 1941  2 Sheets-Sheet 1
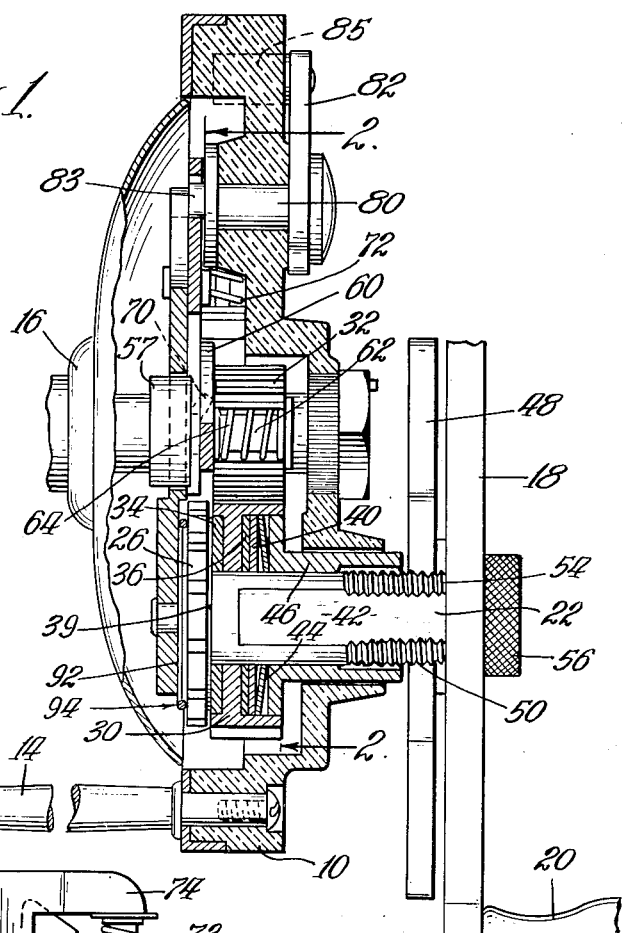
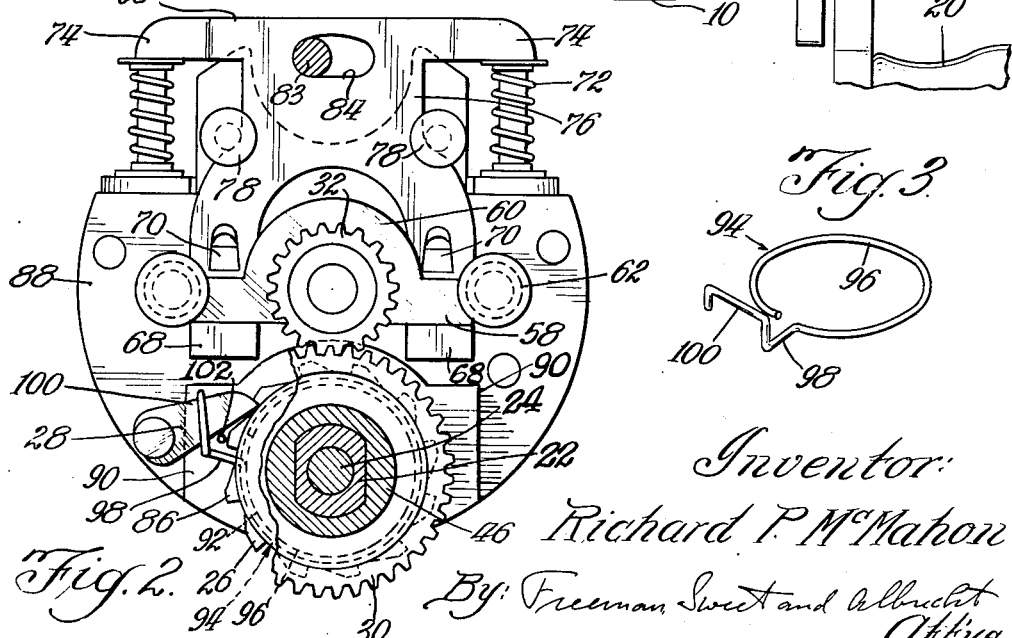
Inventor:
Richard P. McMahon
By: Freeman, Sweet and Albrecht
Att'ys.

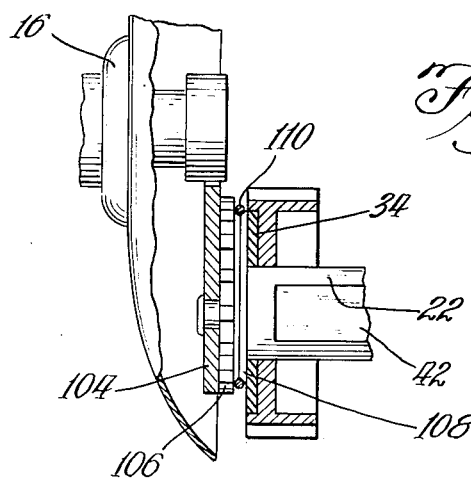
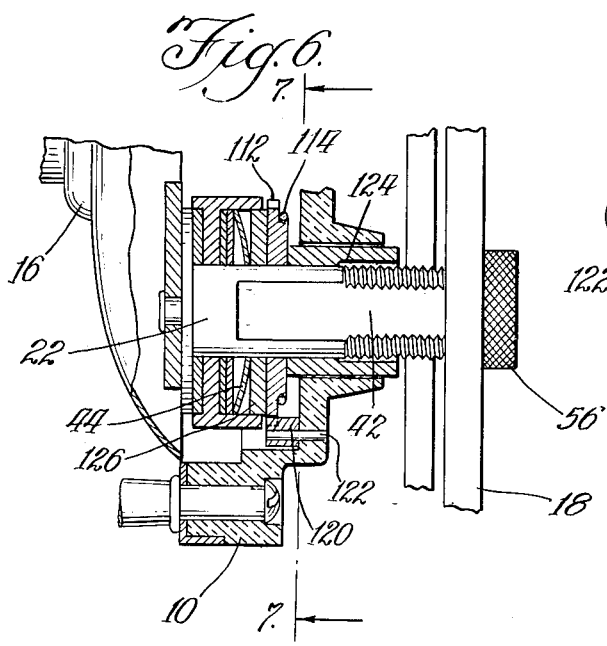
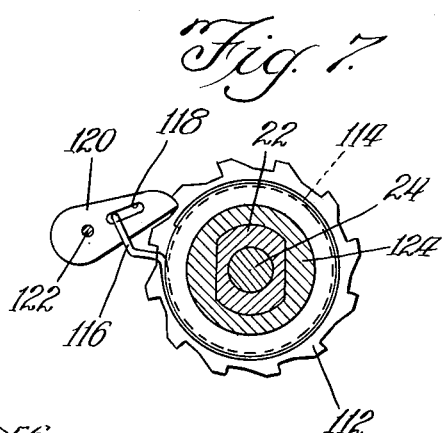

Patented July 25, 1944

2,354,530

UNITED STATES PATENT OFFICE 2,354,530

FISHING REEL

Richard P. McMahon, Bronson, Mich., assignor to Bronson Reel Company, Bronson, Mich., a corporation of Michigan Application January 30, 1941, Serial No. 376,610

3 Claims. (Cl. 242—84.5)

My invention relates to fishing reels of the type commonly referred to as salt water reels, and in which the crank used by the angler to reel in is restrained from motion in the direction of reeling out, and the paying out of line must take place without rotation of the crank, either by disconnecting the spool from the crank or by permitting slippage of a friction connection between the two. Many reels of this type include means for permitting the line to be paid out in either of these ways. My invention includes among its objects and advantages a material increase in quietness and a material reduction in wear in the operation of such a reel.

In the accompanying drawings:

Figure 1 is a median section through a portion of a reel of the type referred to, indicating the application thereto of mechanism according to the invention;

Figure 2 is a view of the chassis plate as on line 2—2 of Figure 1;

Figure 3 is an enlarged perspective of the pawl-shifting spring;

Figure 4 is a plan view of the chassis plate proper;

Figure 5 is a fragmentary view indicating a modified construction in section as in Figure 1;

Figure 6 is a similar fragmentary section indicating another modification; and

Figure 7 is a view in section on line 7—7 of Figure 6.

In the embodiment of the invention selected for illustration in Figures 1 to 4, inclusive, the reel comprises the usual head plate 10 and tail plate 12 interconnected by pillars 14 and supporting the rotating spool 16.

The crank 18 has an operating handle 20 and is rotatable about the axis of the tubular crankshaft 22, which is pivoted on the stud 24. Integrally united to turn with the crankshaft 22 is the ratchet wheel 26 which may be restrained from rotation in the direction of reeling out by the pivoted pawl 28. Loose on the shaft 22 is the drive gear 30 which is at all times in mesh with the pinion 32.

I have illustrated an adjustable friction drive connection between the crankshaft 22 and the gear 30. The web of the gear 30 is positioned between friction washers 34 and 36, and the friction washer 34 bears against the land 39 on the ratchet wheel 26, and the friction washer 36 bears against a metallic washer 40, the central opening of which is flattened on opposite sides to engage the flattened sides 42 of the crank shaft 22. Above the washer 40 is a spring washer 44 and above the spring washer is a thrust sleeve 46. The sleeve 46 fits over the non-circular outer surface of the shaft 22, as indicated in Figure 2, and is thus axially slidable but not rotatable on the shaft. The star wheel 48 engages the threads 50 on the crankshaft 22 and may be screwed down against the thrust sleeve 46 to compress the spring washer 44 so that the web of the gear 30 is gripped between the friction washers 34 and 36.

The crank 18 abuts a shoulder at 54 on the crankshaft 22 and is fastened in place by the usual holding nut 56.

In the type of reel selected for illustration, means are also provided for disconnecting the spool entirely from the gear 30. The pinion 32 includes clutch teeth entering inside the female clutch member 57. The shifting yoke 58 has a U-shaped portion 60, the inner edge of which enters a groove in the pinion 32, and the outer ends of the yoke slide on posts 62 and are urged in the direction for engaging the clutch by coil springs 64. The shifting plate 66 is bifurcated at its lower end to define arms 68 which extend across under the ends of the yoke 58, and from the arms lugs 70 project diagonally upward. It will be apparent that movement of the shifting plate downward from the position of Figure 2 will carry the lugs 70 under the arms of the shifting yoke 58 and force the yoke and pinion out of clutching engagement with the spool. The shifting plate 66 is itself biased toward the position of Figure 2 by coil springs 72 pressing against the arms 74 of the upper corners of the shifting plate, and the movement of the shifting plate is guided by engagement of the lower arms 68 between the posts 62 and by engagement of the edges of the intermediate throat 76 with guiding posts 78. Means are provided for actuating the shifting plate in the nature of a shaft 80 journaled in the head plate 10, which shaft carries an eccentric pin 83 at its inner end, which pin enters a suitable slot 84 in the upper end of the shifting plate. The shaft 80 carries an operating lever 82 provided with a handle 85 accessible to the operator.

The parts so far described were known in the art prior to my invention, but in the reels of the prior art the pawl 28 was provided with a spring which constantly urged it into engagement with the adjacent teeth 86 of the ratchet wheel 26. Accordingly, during reeling in, the pawl would bounce from one tooth to the next and make a clicking or whirring sound depending on the speed of rotation. While such a noise is quite negligible so far as the fish is concerned, it occurs close to the ears of the user and renders it difficult or impossible for the user to remain effectively alert and able to hear other noises. Accordingly, it constitutes an annoyance in the operation of the reel. According to the invention, the chassis plate 88 is countersunk or depressed as indicated at 90 in Figures 2 and 4, and the ratchet wheel 26 is provided with a land 92, the edge of which is provided with a circumferential groove to receive the pawl-biasing element 94. This element includes an arcuate spring portion 96 describing almost a complete circle, an arm portion 98, and a downwardly opening U-shaped portion 100 positioned to overlie the body of the pawl 28. The circular portion 96 in its undistorted condition is slightly smaller than the groove in the land 92 so that it must be expanded a trifle to force it into place, and thereafter it will rub very lightly in its groove. It will be noted that the portion 96 wraps around the land in a counterclockwise direction as seen in Figure 2, so that during movement of the ratchet in a clockwise direction, the force of the friction will tend to relax or unwind the circular portion 96 so far as its gripping action on the groove is concerned, whereas any initial movement of the ratchet wheel in a counterclockwise direction will cause the portion 96 to grip the groove more strongly and to move the pawl 28 positively into the position of Figure 2 at once. To prevent the pawl 28 and yoke 100 from moving so far during reeling in that they become disengaged from each other, stop means are provided. I have illustrated a pin 102 positioned where it will strike the arm 98 of the actuating element and limit the opening movement of the arm and pawl.

In the embodiment illustrated in Figure 5, the chassis plate 104 has no such countersink as at 90 in the chassis plate 88, and the ratchet wheel 106 has a land 108 on its upper surface, which land receives the holding element 110 and also provides the friction surface for the adjacent washer 34.

Without further elaboration the foregoing will so fully explain my invention that others may, by applying knowledge current at the time of application, readily adapt the same for use under various conditions of service. For instance, in Figures 6 and 7 I have illustrated another embodiment in which the ratchet wheel is adjacent the outer, covering portion of the end plate 10 instead of adjacent the chassis plate 88. In this embodiment, the ratchet wheel 112 is splined on the shaft 22 by engaging the same flats 42 as the other splined elements, and the retaining spring 114 is between the sprocket and the cover 10. In this embodiment the pin 102 is omitted, and the spring 114 terminates in a finger 116 which projects down into the slot 118 in the pawl 120, which pawl is suitably pivoted on a pintle 122 fastened in the head plate 10. Upon counterclockwise rotation of the ratchet 112, as viewed in Figure 7, the finger 116 tends to move downward and to the left and the parts occupy the position of Figure 7, with further clockwise rotation of the pawl 120 prevented by the engagement of the pawl with the ratchet. Upon clockwise rotation of the ratchet 112, the finger 116 will move upward and to the right and the pawl 120 will rotate counterclockwise to a position entirely out of the path of the ratchet teeth. This movement is limited by engagement between finger 116 and the end of slot 118. The thrust sleeve 124 transmits its thrust directly through the body of the ratchet wheel down to the overlying washer 126 which presses against the same spring washer 44 employed in Figure 1.

I claim:

1. In a fishing reel of the type embodying a frame; a spool journaled in said frame; a crank journaled on said frame; and a transmission from said crank to said spool including means permitting said spool to pay out line without rotation of said crank; means for preventing rotation of said crank in the direction of paying out line, comprising: a toothed ratchet integrally connected to turn with said crank; a pawl pivoted on said frame; and pawl-biasing means for engaging said pawl with said ratchet at the beginning of any rotation of said crank in the direction of paying out line, and continuously holding said pawl clear of the path of said teeth during rotation of said crank in the direction of reeling in; said biasing means comprising a shifting arm engaging said pawl, a light friction connection between said shifting arm and said crank; said friction connection including a grooved element rotating with said ratchet, and a resilient wire partly encircling said grooved element and resting in said groove, said wire being connected to said shifting arm.

2. In a fishing reel of the type embodying a frame; a spool journaled in said frame; a crank journaled on said frame; and a transmission from said crank to said spool including means permitting said spool to pay out line without rotation of said crank; means for preventing rotation of said crank in the direction of paying out line, comprising: a toothed ratchet integrally connected to turn with said crank; a pawl pivoted on said frame; and pawl-biasing means for engaging said pawl with said ratchet at the beginning of any rotation of said crank in the direction of paying out line, and continuously holding said pawl clear of the path of said teeth during rotation of said crank in the direction of reeling in; said biasing means comprising a shifting arm engaging said pawl, a light friction connection between said shifting arm and said crank; said friction connection including a grooved element rotating with said ratchet, and a resilient wire partly encircling said grooved element and resting in said groove, said wire being connected to said shifting arm; said wire encircling said element in a direction such that the friction tends to uncoil said wire and reduce the friction during movement in the direction of reeling in.

3. In a fishing reel of the type embodying a frame; a spool journaled in said frame; a crank journaled on said frame; and a transmission from said crank to said spool including means permitting said spool to pay out line without rotation of said crank; means for preventing rotation of said crank in the direction of paying out line, comprising: a toothed ratchet integrally connected to turn with said crank; a pawl pivoted on said frame; and pawl-biasing means for engaging said pawl with said ratchet at the beginning of any rotation of said crank in the direction of paying out line, and continuously holding said pawl clear of the path of said teeth during rotation of said crank in the direction of reeling in; said biasing means comprising a shifting arm engaging said pawl, a light friction connection between said shifting arm and said crank, and stop means to limit movement of the parts in the direction for disengaging said pawl, said stop means comprising a portion of said arm end entering a slot in said pawl, said arm moving in a direction oblique to said slot, one end of said slot being positioned to engage said arm and limit the movement of said parts during reeling in.

RICHARD P. McMAHON.